United States Patent
Inagaki

(10) Patent No.: US 11,732,806 B2
(45) Date of Patent: Aug. 22, 2023

(54) SEAL RING AND VALVE DEVICE

(71) Applicant: DENSO CORPORATION, Kariya (JP)

(72) Inventor: Noriyuki Inagaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/649,109

(22) Filed: Jan. 27, 2022

(65) Prior Publication Data

US 2022/0145995 A1 May 12, 2022

Related U.S. Application Data

(63) Continuation of application No. PCT/JP2020/026292, filed on Jul. 3, 2020.

(30) Foreign Application Priority Data

Aug. 1, 2019 (JP) .................................. 2019-142393

(51) Int. Cl.
F16K 1/226 (2006.01)
F16J 15/3272 (2016.01)
F16J 15/3284 (2016.01)

(52) U.S. Cl.
CPC ......... *F16K 1/2261* (2013.01); *F16J 15/3272* (2013.01); *F16J 15/3284* (2013.01); *F16K 1/226* (2013.01)

(58) Field of Classification Search
CPC ....... F16K 1/2261; F16K 1/226; F02M 26/54; F02M 26/70; F16J 15/106; F16J 15/3272; F16J 15/3284
USPC .................................................. 251/305–308
See application file for complete search history.

(56) References Cited

U.S. PATENT DOCUMENTS

| | | | | |
|---|---|---|---|---|
| 1,591,903 A | * | 7/1926 | White ................... | F16K 1/2285 251/175 |
| 3,556,475 A | * | 1/1971 | Olenik .................. | F16K 1/2261 277/637 |
| 4,248,404 A | * | 2/1981 | Goldman .............. | F16K 1/2261 251/307 |
| 4,358,086 A | * | 11/1982 | Hiltebrand ............ | F16K 1/2261 251/308 |
| 4,604,254 A | * | 8/1986 | Yamamoto .......... | F16K 27/0272 264/254 |
| 4,899,984 A | * | 2/1990 | Strickler ............... | F16K 1/2261 251/306 |
| 5,707,040 A | * | 1/1998 | Gasaway .............. | F16K 1/2263 251/305 |
| 8,276,880 B2 | * | 10/2012 | Kolb ..................... | F16K 1/2261 251/306 |

(Continued)

FOREIGN PATENT DOCUMENTS

| | | |
|---|---|---|
| JP | 2006-234169 | 9/2006 |
| JP | 2007-292296 | 11/2007 |

(Continued)

*Primary Examiner* — John Bastianelli
(74) *Attorney, Agent, or Firm* — Nixon & Vanderhye P.C.

(57) ABSTRACT

A seal ring is made of resin, applied to a valve body that changes an opening degree of a fluid passage through which a fluid passes, and that seals, when the valve body fully closes the fluid passage, between an inner peripheral surface defining the fluid passage and an outer peripheral edge of the valve body. The seal ring includes a ring main body fitted in an outer peripheral groove formed on the outer peripheral edge.

15 Claims, 9 Drawing Sheets

(56) References Cited

U.S. PATENT DOCUMENTS

| | | | |
|---|---|---|---|
| 8,528,880 B2* | 9/2013 | LaBenz | F16J 15/0887 |
| | | | 277/637 |
| 2009/0020099 A1* | 1/2009 | Bessho | F16K 1/228 |
| | | | 123/337 |
| 2018/0038489 A1* | 2/2018 | Hielkema | F16K 1/205 |
| 2018/0258889 A1* | 9/2018 | Ishigaki | F16K 1/2268 |
| 2018/0266567 A1* | 9/2018 | Hadley | F16K 1/2261 |

FOREIGN PATENT DOCUMENTS

| | | |
|---|---|---|
| JP | 2010-216632 | 9/2010 |
| JP | 2015-094335 | 5/2015 |
| JP | 2016-211678 | 12/2016 |
| JP | 2019-039462 | 3/2019 |

\* cited by examiner

SEAL RING AND VALVE DEVICE

CROSS REFERENCE TO RELATED APPLICATIONS

The present application is a continuation application of International Patent Application No. PCT/JP2020/026292 filed on Jul. 3, 2020, which designated the U.S. and claims the benefit of priority from Japanese Patent Application No. 2019-142393 filed on Aug. 1, 2019. The entire disclosures of all of the above applications are incorporated herein by reference.

TECHNICAL FIELD

The present disclosure relates to a seal ring and a valve device including the seal ring.

BACKGROUND

A valve device that changes an opening degree of a passage through which a gas flows by rotating a valve body is known. The valve device includes a seal ring made of resin and having a flat plate shape in a cross section covers an outer circumference of a valve body. This configuration can suppress gas leakage when the valve body is fully closed while alleviating dimensional tolerances.

SUMMARY

The present disclosure provides a seal ring made of resin, applied to a valve body that changes an opening degree of a fluid passage through which a fluid passes, and that seals, when the valve body fully closes the fluid passage, between an inner peripheral surface defining the fluid passage and an outer peripheral edge of the valve body. The seal ring includes a ring main body fitted in an outer peripheral groove formed on the outer peripheral edge.

BRIEF DESCRIPTION OF DRAWINGS

The features and advantages of the present disclosure will become more apparent from the following detailed description made with reference to the accompanying drawings. In the drawings.

DETAILED DESCRIPTION

Figure 1:
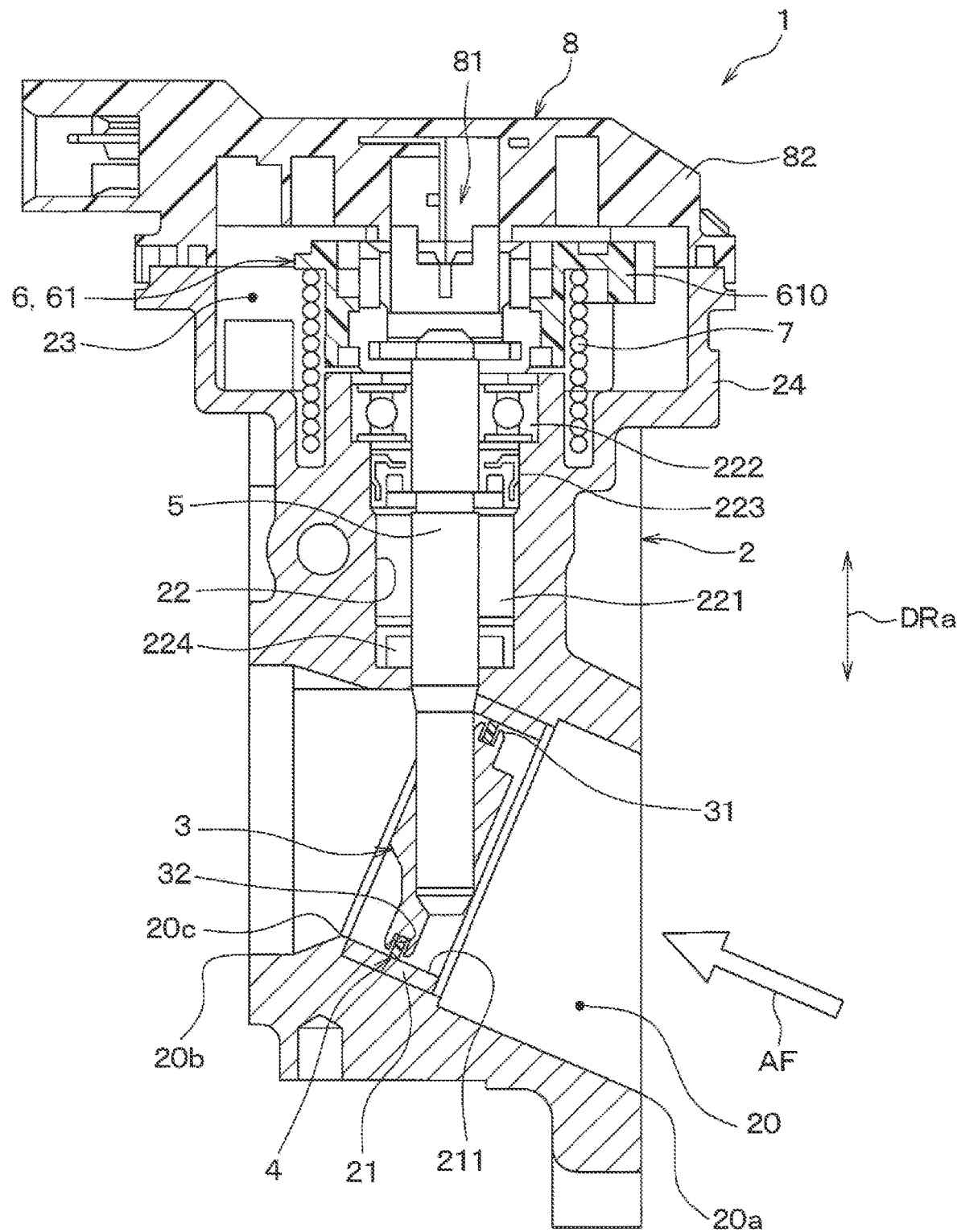
FIG. 1 is a schematic diagram showing a valve device according to a first embodiment.

The present inventors have diligently studied sealing property of the resin seal ring. According to this study, it was found that in the resin seal ring, for example, flatness of the seal ring may be deteriorated due to sink marks or deformation during resin molding. When the flatness of the seal ring deteriorates, surface pressure at the time of contact (that is, the contact surface pressure) decreases, and the sealing property deteriorates.

The present disclosure provides a seal ring and a valve device capable of suppressing deterioration of sealing property.

An exemplary embodiment of the present disclosure provides a seal ring. The seal ring is made of resin, is applied to a valve body that changes an opening degree of a fluid passage through which a fluid passes, and seals, when the valve body fully closes the fluid passage, between an inner peripheral surface defining the fluid passage and an outer peripheral edge of the valve body. The seal ring includes a ring main body and a protrusion. The ring main body is fitted in an outer peripheral groove formed on the outer peripheral edge. The protrusion is provided on the ring main body, that extends in a circumferential direction of the ring main body, and that protrudes from the ring main body toward the outer peripheral groove. The outer peripheral groove has a groove bottom surface facing the inner peripheral surface when the valve body is fully closed, and a pair of groove side surfaces that are connected to the groove bottom surface and face each other. The ring main body has a pair of groove facing surfaces that at least partially face the pair of groove side surfaces. The protrusion is provided on at least one of the pair of groove facing surfaces.

In the exemplary embodiment of the present disclosure, the protrusion is provided on the groove facing surface that faces the groove side surface forming a seal surface in the outer peripheral groove. Even when the flatness of the ring main body deteriorates, the protrusion can makes it easy for the seal ring to be in contact with outer peripheral groove. Thus, the configuration can suppress a decrease in the surface pressure at the time of contact. With the seal ring according to the present disclosure, it is easy to secure the surface pressure at the time of contact between the outer peripheral groove of the valve body and the seal ring, so that deterioration of the sealing property can be suppressed.

Here, the flatness indicates smoothness (that is, uniformity) of the plane, and is the magnitude of the deviation from the geometrically correct plane of the plane shape.

Another exemplary embodiment of the present disclosure provides a valve device. The valve device includes a valve body and a seal ring. The valve body changes an opening degree of a fluid passage through which a fluid passes. The seal ring is made of resin and seals, when the valve body fully closes the fluid passage, between an inner peripheral surface defining the fluid passage and an outer peripheral edge of the valve body. The seal ring includes a ring main body fitted in an outer peripheral groove formed on the outer peripheral edge; and a protrusion provided on the ring main body, that extends in a circumferential direction of the ring main body, and that protrudes from the ring main body toward the outer peripheral groove. The outer peripheral groove has a groove bottom surface facing the inner peripheral surface when the valve body is fully closed, and a pair of groove side surfaces that are connected to the groove bottom surface and face each other. The ring main body has a pair of groove facing surfaces that at least partially face the pair of groove side surfaces. The protrusion is provided on at least one of the pair of groove facing surfaces.

In another exemplary embodiment of the present disclosure, the protrusion is provided on the ring main body so as to protrude toward the outer peripheral groove. Even when the flatness of the ring main body deteriorates, the protrusion can makes it easy for the seal ring to be in contact with outer peripheral groove. Thus, the configuration can suppress a decrease in the surface pressure at the time of contact. With the valve device according to the present disclosure, it is easy to secure the surface pressure at the time of contact between the outer peripheral groove of the valve body and the seal ring, so that deterioration of the sealing property can be suppressed.

Hereinafter, embodiments of the present disclosure will be described with reference to the drawings. In the following embodiments, parts, which are the same as or equivalent to those described in the preceding embodiment(s), will be indicated by the same reference signs, and the description thereof may be omitted. Also, in the following embodiments, when only some of the constituent elements are described, corresponding constituent elements of a previously described one or more of the embodiments may be applied to the rest of the constituent elements. The following embodiments may be partially combined with each other even if such a combination is not explicitly described as long as there is no disadvantage with respect to such a combination.

First Embodiment

The present embodiment will be described with reference to FIGS. 1 to 10. The present embodiment describes an example in which a valve device 1 including a seal ring 4 of the present disclosure is applied to an EGR valve of an EGR device. EGR is an abbreviation for Exhaust Gas Recirculation.

The EGR device is a device that returns a part of exhaust gas discharged from a combustion chamber of an engine to an intake side of the engine. The EGR valve is a flow rate adjusting valve that adjusts the flow rate of the exhaust gas returned to the intake side of the engine.

As shown in FIG. 1, the valve device 1 includes a housing 2, a valve body 3, a shaft 5, a valve drive unit 6, a return spring 7, a rotation angle detection unit 8, and the like. Note that FIG. 1 shows the valve device 1 when the valve body 3 fully closes a gas passage 20.

The housing 2 is manufactured by, for example, aluminum die casting. The housing 2 is formed with a gas passage 20 through which the exhaust gas flows. The gas passage 20 is a fluid passage through which a fluid passes. As shown by the arrow AF in FIG. 1, the exhaust gas flows through the gas passage 20 from a passage inlet 20a toward a passage outlet 20b. The gas passage 20 is provided with a bent portion 20c between the passage inlet 20a where the exhaust gas flows in and the passage outlet 20b where the exhaust gas flows out. The bent portion 20c changes the flow direction of the exhaust gas. That is, the axial direction of the gas passage 20 on the passage inlet 20a side and the axial direction of the gas passage 20 on the passage outlet 20b side intersect at a predetermined angle in the bent portion 20c. A metal (for example, stainless steel) cylindrical nozzle 21 is press-fitted and fixed to the gas passage 20 on the side of the passage inlet 20a from the bent portion 20c. The cylindrical nozzle 21 constitutes a part of the gas passage 20 on the passage inlet 20a side.

In addition to the gas passage 20, the housing 2 is formed with a bearing hole 22, a gear chamber 23, and the like. The bearing hole 22 is formed closer to the gas passage 20 than the gear chamber 23. The end of the bearing hole 22 on the gas passage 20 side communicates with the gas passage 20. The bearing hole 22 is formed in a direction orthogonal to the gas passage 20 on the passage outlet 20b side. The bearing hole 22 has a stepped shape in which the inner diameter gradually decreases as it approaches the gas passage 20. A first bearing 221 and a second bearing 222 for rotatably supporting the shaft 5 are fixed to the inner circumference of the bearing hole 22 by press fitting.

The first bearing 221 is arranged in the bearing hole 22 at a position closer to the gas passage 20 than the second bearing 222. The first bearing 221 is composed of, for example, a slide bearing. Further, the second bearing 222 is arranged in the bearing hole 22 at a position farther from the gas passage 20 than the first bearing 221. The second bearing 222 is composed of, for example, a ball bearing.

An oil seal 223 is provided between the first bearing 221 and the second bearing 222 to prevent oil or the like contained in the exhaust gas from flowing into the gear chamber 23. The bearing hole 22 is provided with a gas seal 224 that prevents foreign matter such as carbon deposits from entering at a position closer to the gas passage 20 than the first bearing 221.

The gear chamber 23 is a space partitioned by a cylindrical portion 24 formed in the housing 2 in connection with the bearing hole 22 and a sensor cover 82 of the rotation angle detection unit 8 covering the tubular portion. The gear chamber 23 accommodates a motor (not shown), a gear train 61, a return spring 7, and the like that constitute the valve drive unit 6.

The shaft 5 is inserted into the bearing hole 22 so as to penetrate the bearing hole 22. In the shaft 5, one end of the shaft 5 in the axial direction DRa protrudes into the cylindrical nozzle 21 forming the gas passage 20 on the passage inlet 20a side. A valve body 3 is provided at one end of the shaft 5 in the axial direction DRa.

The valve body 3 changes the opening degree (that is, the passage area) of the gas passage 20. The valve body 3 is provided as a butterfly valve having a substantially circular plate shape. The valve body 3 is arranged in a direction orthogonal to the axial direction of the cylindrical nozzle 21. The valve body 3 is integrally formed with one end of the shaft 5 in a state of being tilted by a predetermined angle with respect to the axial direction DRa of the shaft 5. The detailed configuration of the valve body 3 will be described later.

The valve drive unit 6 includes a motor (not shown) that receives electric power to generate torque, and a gear train 61 that amplifies the drive torque of the motor and transmits it to the shaft 5. The motor is, for example, a DC motor, and is energized and controlled by an ECU (not shown).

The gear train 61 is configured by, for example, meshing multiple gears. The gear train 61 is a deceleration means composed of a pinion gear (not shown) attached to the output shaft of the motor, a valve gear 610 attached to the other end of the shaft 5, and an intermediate gear (not shown) that transmits the rotation of the pinion gear to the valve gear 610.

The return spring 7 urges the valve body 3 toward the valve closing direction. The return spring 7 is a coil spring and is coaxially arranged around the shaft 5. Specifically, the return spring 7 is assembled between the housing 2 and the valve gear 610 so that the valve body 3 is urged toward the valve closing direction.

The rotation angle detection unit 8 is a non-contact position sensor that detects the opening degree of the valve body 3 based on the rotation angle of the shaft 5. Specifically, the rotation angle detection unit 8 includes a detection unit 81 attached to the inner circumference of the valve gear 610. The detection unit 81 is composed of, for example, a magnetic sensor including a Hall element and a permanent magnet. For example, when the permanent magnet rotates together with the valve gear 610, the detection unit 81 outputs an electric signal proportional to the magnetic flux density penetrating the Hall element to an ECU (not shown).

The sensor cover 82 is attached to the end surface of the housing 2 forming the gear chamber 23 via a sealing component (not shown). The sensor cover 82 is fixed to the housing 2 by a screw or the like (not shown) and airtightly covers the gear chamber 23.

The ECU calculates the target opening degree of the valve body 3 according to the operating state of the engine grasped from the accelerator opening degree, the engine speed, and the like. The ECU performs feedback control of the power supply to the motor such that the actual opening degree of the valve body 3 detected by the detection unit 81 matches the target opening.

Figure 2:
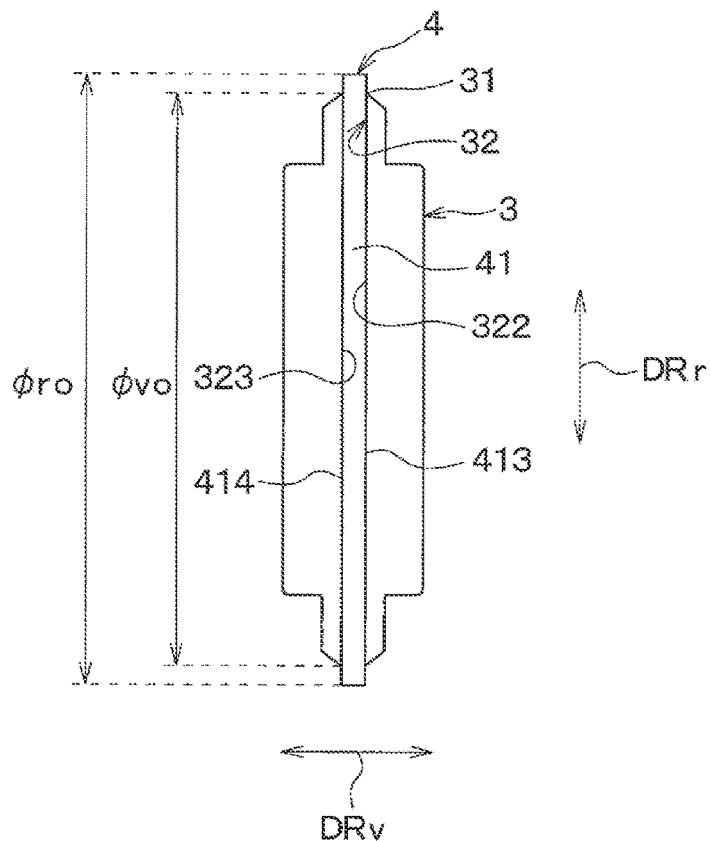
FIG. 2 is a schematic diagram showing a side surface of a valve body of the valve device according to the first embodiment.
Figure 3:
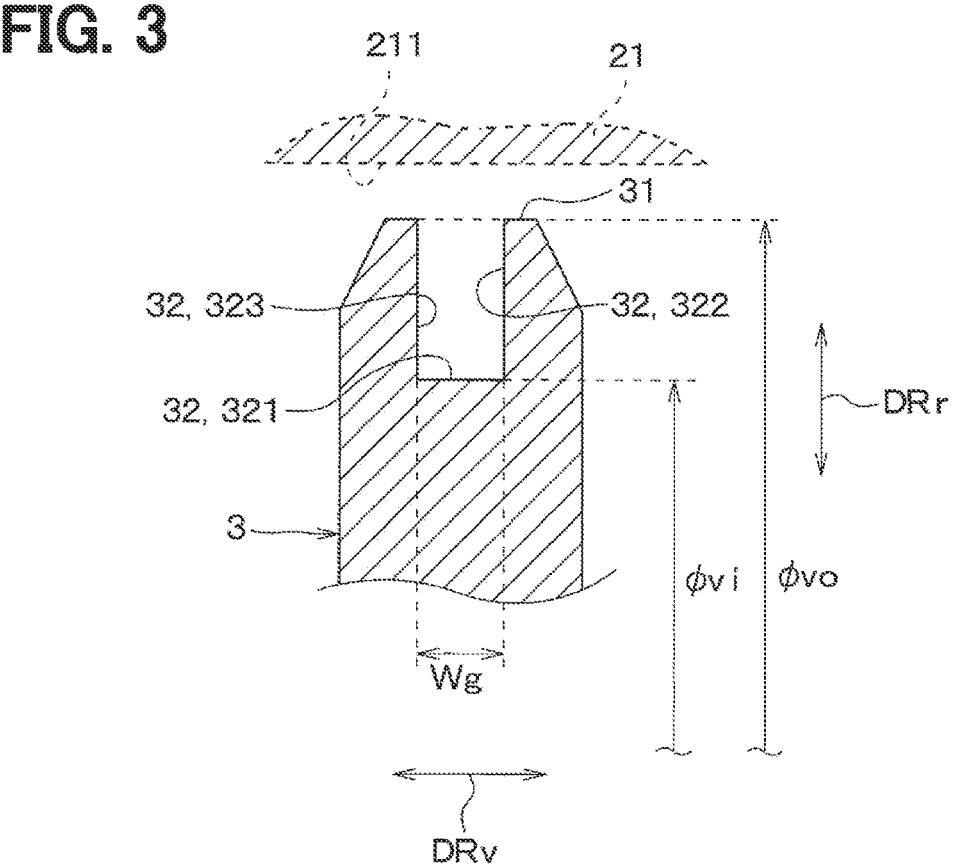
FIG. 3 is a schematic cross-sectional diagram showing a part of the valve device according to the first embodiment.

Subsequently, the details of the valve body 3 will be described with reference to the drawings. The valve body 3 has an outer peripheral edge 31 facing the cylindrical nozzle 21 forming the gas passage 20. As shown in FIGS. 2 and 3, the valve body 3 has an outer peripheral groove 32 formed on the entire circumference of the outer peripheral edge 31. The outer peripheral groove 32 is recessed in a quadrangular cross section.

The outer peripheral groove 32 has a groove bottom surface 321 and a pair of groove side surfaces 322 and 323. The groove bottom surface 321 faces the inner peripheral surface 211 defining the gas passage 20 when the valve body 3 is fully closed. The pair of groove side surfaces 322 and 323 are connected to the groove bottom surface 321 and face each other. The inner peripheral surface 211 defining the gas passage 20 is the inner wall surface of the cylindrical nozzle 21.

The pair of groove side surfaces 322 and 323 are a first groove side surface 322 which is one of groove side surfaces and a second groove side surface 323 which is the other one of groove side surfaces. The second groove side surface 323 is located more downstream of the gas passage 20 than the first groove side surface 322 when the valve body 3 is fully closed.

In the valve body 3, the valve diameter $\Phi vo$ which is the diameter at the outer peripheral edge 31 is larger than the valve groove diameter $\Phi vi$ which is the diameter at the groove bottom surface 321. The outer peripheral groove 32 of the valve body 3 is set to a groove width Wg that can accommodate the seal ring 4.

The seal ring 4 is a resin member that seals between the inner peripheral surface 211 forming the gas passage 20 and the outer peripheral edge 31 of the valve body 3 when the valve body 3 is fully closed. That is, the seal ring 4 has a sealing function to close a gap between the inner peripheral surface 211 of the cylindrical nozzle 21 and the outer peripheral edge 31 of the valve body 3 when the valve body 3 fully closes the gas passage 20 on the passage inlet 20a side. The seal ring 4 has a ring main body 41 that is fitted into the outer peripheral groove 32.

Figure 4:
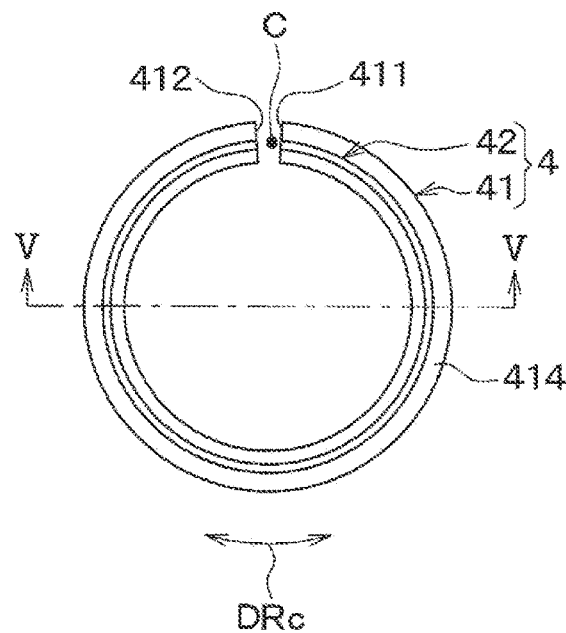
FIG. 4 is a schematic diagram showing a seal ring according to the first embodiment.
Figure 5:
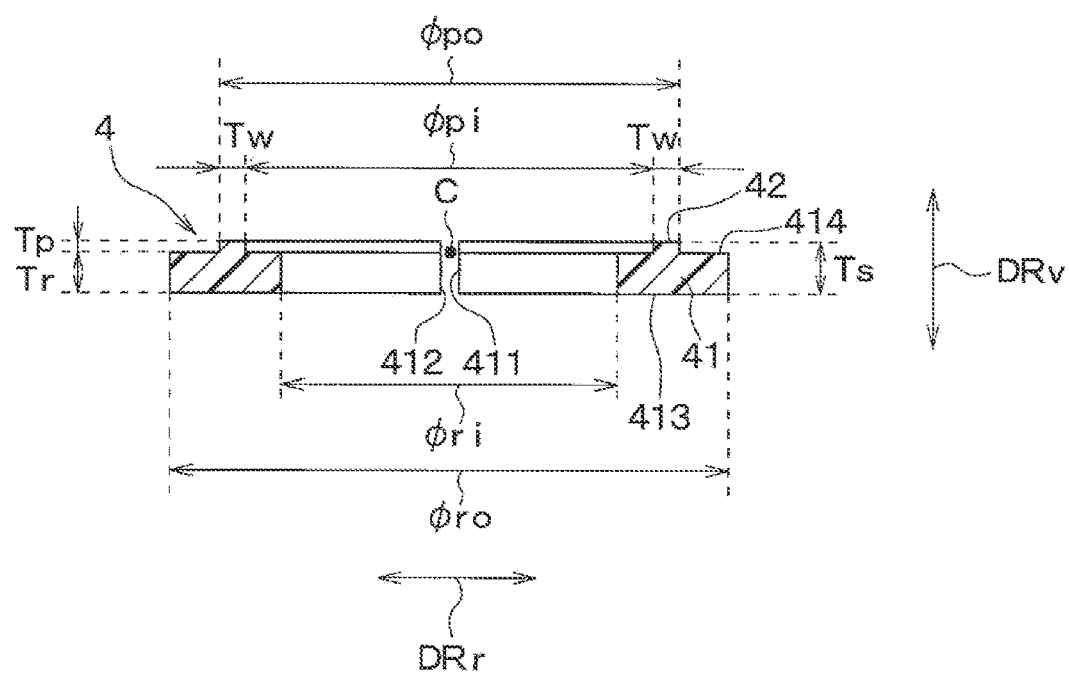
FIG. 5 is a cross-sectional view taken along line V-V of FIG. 4.

As shown in FIGS. 4 and 5, the ring main body 41 has a C-shape. The ring main body 41 is formed with a predetermined gap C between the first peripheral end portion 411 and a second peripheral end portion 412 each located at the end of the peripheral direction DRc. In the present embodiment, the first peripheral end portion 411 constitutes one peripheral end portion of the ring main body 41, and the second peripheral end portion 412 constitutes the other peripheral end portion of the ring main body 41.

The ring main body 41 is composed of a square ring having a substantially quadrangular cross-sectional shape. That is, the ring main body 41 has a quadrangular cross-sectional shape. It should be noted that the quadrangular cross-sectional shape does not mean only a strict quadrangular shape, but also includes a quadrangular shape whose corner is cut into a straight line or an arc shape by chamfering or the like.

Figure 6:
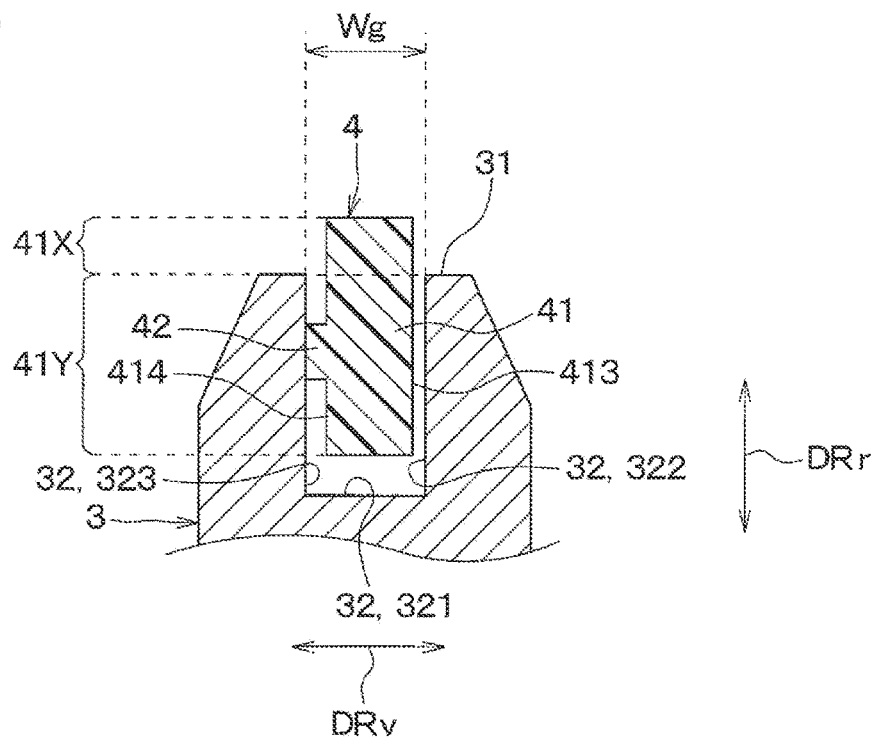
FIG. 6 is an explanatory diagram for explaining the relationship between the valve body of the valve device and the seal ring according to the first embodiment.

Further, the ring main body 41 has a ring outer diameter $\Phi ro$ larger than the valve diameter $\Phi vo$ of the outer peripheral edge 31 so that a part of the ring main body 41 protrudes to the outside of the outer peripheral groove 32. As a result, as shown in FIG. 6, the ring main body 41 has an outer diameter portion 41X located outside the outer peripheral groove 32 and an inner diameter portion 41Y located inside the outer peripheral groove 32.

The ring main body 41 has a pair of groove facing surfaces 413 and 414 that at least partially face the pair of groove side surfaces 322 and 322. The pair of groove facing surfaces 413 and 414 are a first groove facing surface 413 which is one of groove facing surfaces and a second groove facing surface 414 which is the other one of groove facing surfaces. The second groove facing surface 414 is located more downstream of the gas passage 20 than the first groove facing surface 413 when the valve body 3 is fully closed. In the ring main body 41, the first groove facing surface 413 faces the first groove side surface 322 of the outer peripheral groove 32, and the second groove facing surface 414 faces the second groove side surface 323 of the outer peripheral groove 32. The first groove facing surface 413 constitutes a pressure reception surface that receives the pressure of the exhaust gas when the valve body 3 is fully closed. The first groove facing surface 413 is a flat surface extending along the radial direction DRr.

The seal ring 4 is provided with a protrusion 42 protruding from the ring main body 41 toward the outer peripheral groove 32. The ring main body 41 and the protrusion 42 are configured as an integrally molded member that is integrally molded.

The protrusion 42 has a quadrangular cross-sectional shape in the direction orthogonal to the circumferential DRc. In the protrusion 42, a width dimension orthogonal to the protrusion direction is greater than the height dimension in the protrusion direction.

The protrusion 42 is provided on the second groove facing surface 414 of the ring main body 41 so as to protrude toward the second groove side surface 323 forming the seal surface in the outer peripheral groove 32. The protrusion 42 is provided on the inner diameter portion 41Y of the ring main body 41 so as to face the second groove side surface 323.

Specifically, in the protrusion 42, the outer diameter Φpo on the outer side of the radial direction DRr of the seal ring 4 is smaller than the valve diameter Φvo of the valve body 3. Further, in the protrusion 42, the inner diameter Φpi inside the radial direction DRr of the seal ring 4 is larger than the ring inner diameter Φri of the ring main body 41. The ring main body 41 is set to have the ring inner diameter Φri smaller than the valve diameter Φvo so as not to come out of the outer peripheral groove 32.

Further, the thickness Tp of the protrusion 42 in the axial direction DRv is smaller than the thickness Tr of the ring main body 41. Further, the protrusion 42 has a width Tw of the radial direction DRr of the seal ring 4 larger than the thickness Tp of the axial direction DRv so that a contact area when contacting the second groove side surface 323 can be secured to some extent.

As shown in FIG. 4, the protrusion 42 is provided along the circumferential direction DRc so as to be continuously connected from the first peripheral end portion 411 to the second peripheral end portion 412 of the ring main body 41. That is, the protrusion 42 is provided over the entire area of the ring main body 41 in the circumferential direction DRc.

Here, the valve device 1 may be used in a cold region, and the temperature of the gas passage 20 may change from an extremely low temperature to an extremely high temperature. Further, the materials of the valve body 3 and the seal ring 4 may be different. Therefore, a clearance is provided between the valve body 3 and the seal ring 4 in consideration of the difference in linear expansion. Specifically, in the seal ring 4, the thickness Ts in the axial direction DRv is smaller than the groove width Wg of the outer peripheral groove 32. The ring inner diameter Φri of the seal ring 4 is larger than the valve groove diameter Φvi of the outer peripheral groove 32.

An operation of the above valve device 1 will be explained. When the flow rate of the exhaust gas returned to the intake side of the engine is increased, the valve device 1 rotationally displaces the valve body 3 so that the opening degree of the gas passage 20 increases. On the other hand, when the flow rate of the exhaust gas returned to the intake side of the engine is decreased, the valve device 1 rotationally displaces the valve body 3 so that the opening degree of the gas passage 20 decreases. Then, when the exhaust gas is not returned to the intake side of the engine, the valve device 1 rotationally displaces the valve body 3 at a position where the gas passage 20 is closed, as shown in FIG. 1. When the valve body 3 is closed, the pressure of the exhaust gas acts on the first groove facing surface 413 of the ring main body 41, so that, in the seal ring 4, the second groove facing surface 414 is pressed so as to approach the second groove side surface 323 of the outer peripheral groove 32.

Figure 7:
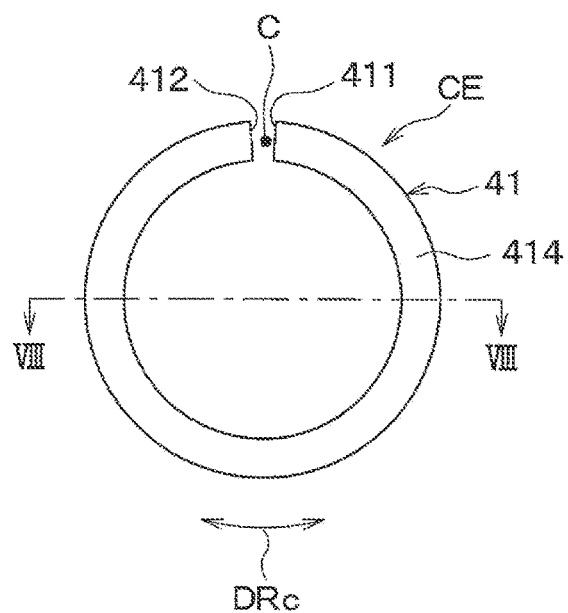
FIG. 7 is a schematic diagram showing a seal ring as a comparative example of the first embodiment.

Here, FIG. 7 shows a seal ring CE as a comparative example of the seal ring 4 of the present embodiment. The seal ring CE of the comparative example is different in that a surface facing the outer peripheral groove 32 is configured to be flat, that is, there is no protrusion corresponding to the protrusion 42 provided in the seal ring 4 of the present embodiment.

Figure 8:
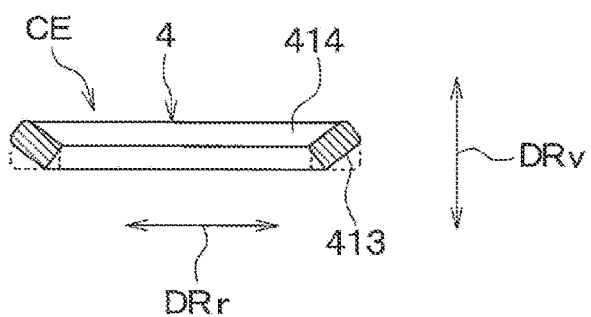
FIG. 8 is a cross-sectional view on a line VIII-VIII in FIG. 7.

In the seal ring CE of the comparative example, the flatness of the seal ring CE may deteriorate due to sink marks or deformation during resin molding. For example, as shown in FIG. 8, the seal ring CE may have a shape in which the positions of the inner diameter side and the outer diameter side are displaced in the axial direction DRv of the seal ring CE due to sink marks or deformation during resin molding.

Figure 9:
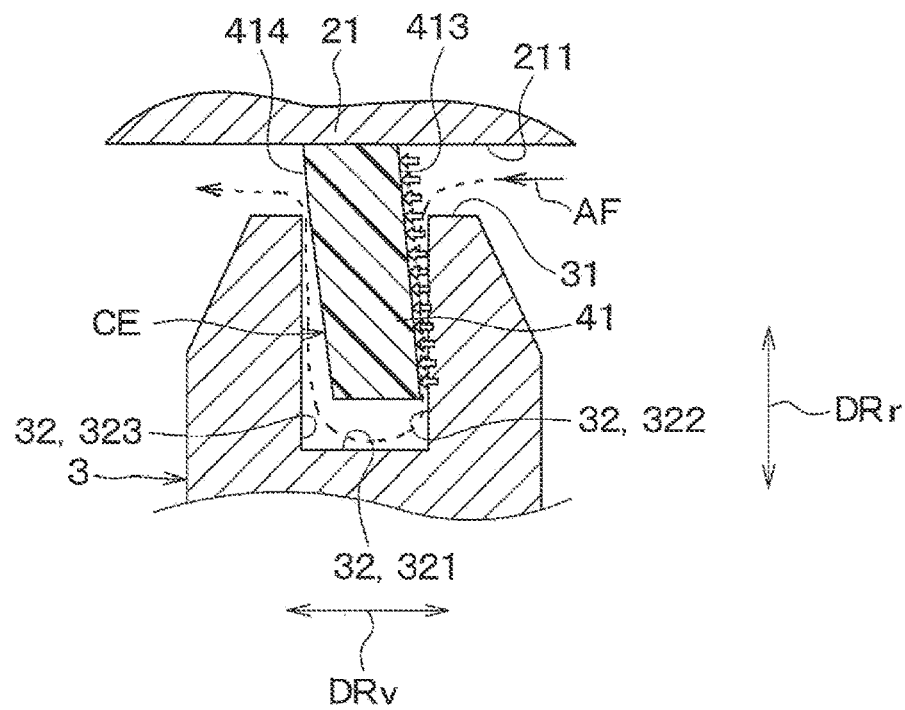
FIG. 9 is an explanatory diagram for explaining sealing property of a seal ring as a comparative example of the first embodiment.

When the seal ring CE in this state is attached to the outer peripheral groove 32 of the valve body 3, as shown in FIG. 9, the outer peripheral groove 32 and the seal ring CE are partially apart from each other in the circumferential direction DRc even when the valve body 3 is fully closed. That is, when the seal ring CE is attached to the outer peripheral groove 32 of the valve body 3, the contact surface pressure with the outer peripheral groove 32 decreases when the valve body 3 is fully closed, and the sealing property deteriorates. In this case, even when the valve body 3 is fully closed, a part of the exhaust gas leaks to the gas passage 20 on the passage outlet 20b side. When the exhaust gas leaks into the gas passage 20 on the side of the passage outlet 20b, for example, the water contained in the exhaust gas is condensed by an EGR cooler (not shown). The generation of this condensed water is not preferable because it causes corrosion of the EGR cooler and liquid compression in the turbocharger upstream of the engine.

On the other hand, the seal ring 4 of the present embodiment has a protrusion 42 protruding toward the second groove side surface 323 of the outer peripheral groove 32. That is, the protrusion 42 is provided on the second groove facing surface 414 of the ring main body 41 with respect to the second groove side surface 323 formed on the seal surface in the outer peripheral groove 32.

Figure 10:
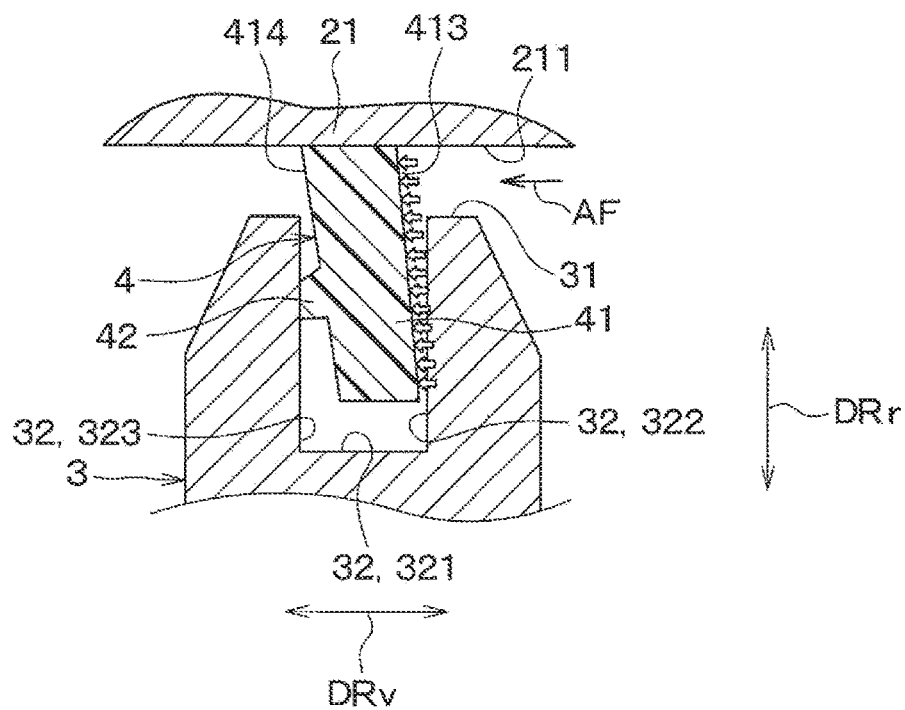
FIG. 10 is an explanatory diagram for explaining sealing property of the seal ring according to the first embodiment.

According to this, even if the flatness of the ring main body 41 deteriorates, as shown in FIG. 10, the protrusion 42 makes it easier for the seal ring 4 to come into contact with the outer peripheral groove 32, so that it is possible to suppress a decrease in the contact surface pressure.

According to the seal ring 4 and the valve device 1 of the present embodiment described above, it is easy to secure the surface pressure at the time of contact between the outer peripheral groove 32 of the valve body 3 and the seal ring 4, so that deterioration of the sealing property can be suppressed.

Further, the protrusion 42 is provided in the inner diameter portion 41Y located inside the outer peripheral groove 32 in the ring main body 41. According to this, as compared with the case where the protrusion 42 is provided in the outer diameter portion 41X, the seal ring 4 is more likely to come into contact with the outer peripheral groove 32, so that it is possible to sufficiently suppress the decrease in the surface pressure at the time of contact. In addition, since the seal ring 4 is easily in contact with the outer peripheral groove 32, it is possible to prevent the seal ring 4 from coming out of the outer peripheral groove 32.

Specifically, the protrusion 42 is provided on the second groove facing surface 414 of the ring main body 41 with respect to the second groove side surface 323 formed on the seal surface in the outer peripheral groove 32. According to this, the protrusion 42 is pressed against the second groove side surface 323 of the outer peripheral groove 32 by the exhaust gas flowing through the gas passage 20 when the valve body 3 is fully closed. At this time, since the pressure at the time of contact is concentrated on the protrusion 42, it is possible to sufficiently secure the surface pressure at the time of contact between the outer peripheral groove 32 of the valve body 3 and the seal ring 4.

In addition, the protrusion 42 is continuously provided along the circumferential DRc from the first peripheral end portion 411 to the second peripheral end portion 412 located at the ends of ring main body 41 in the circumferential DRc. When the protrusion 42 is provided from the first peripheral end portion 411 to the second peripheral end portion 412 of the ring main body 41 in this way, a gap between the seal ring 4 and the outer peripheral groove 32 is unlikely to occur. Thus, the deterioration of the sealing property can be sufficiently suppressed.

Specifically, the protrusion 42 has a quadrangular cross-sectional shape in the direction orthogonal to the circumferential DRc. As described above, when the cross-sectional shape of the protrusion 42 is quadrangular, the protrusion 42 makes it easier for the seal ring 4 to come into contact with the outer peripheral groove 32, so that it is possible to suppress a decrease in the surface pressure at the time of contact.

(First Modification of First Embodiment)

Figure 11:
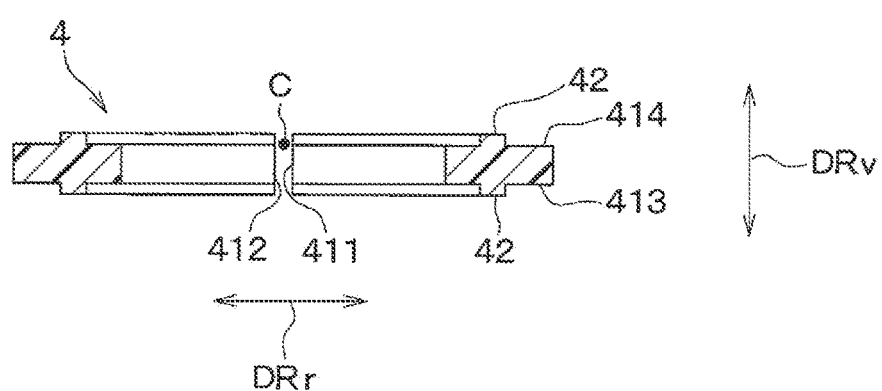
FIG. 11 is a schematic cross-sectional view showing a first modification of a seal ring according to the first embodiment.

The seal ring 4 of the first embodiment described above is provided with a protrusion 42 on the second groove facing surface 414 of the ring main body 41, but the present disclosure is not limited thereto. For example, as shown in FIG. 11, the seal ring 4 may be provided with a protrusion 42 on each of the first groove facing surface 413 and the second groove facing surface 414. When the valve device 1 is applied to a device in which the direction of the fluid flowing through the gas passage 20 changes, it is desirable to provide a protrusion 42 on each of the first groove facing surface 413 and the second groove facing surface 414. The seal ring 4 may be provided with a protrusion 42 on the first groove facing surface 413.

(Second Modification of First Embodiment)

Figure 12:
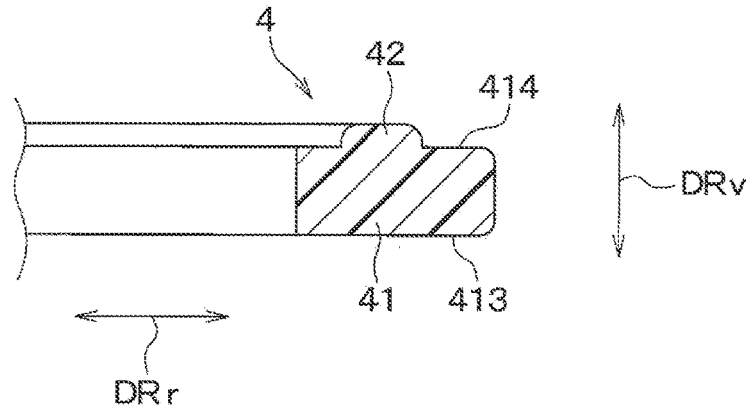
FIG. 12 is a schematic partial cross-sectional view showing a second modification of a seal ring according to the first embodiment.

The protrusion 42 of the first embodiment described above has a quadrangular cross-sectional shape, but is not limited thereto. As shown in FIG. 12, the protrusion 42 may have its corners cut into arc shapes by chamfering or the like. The corners of the protrusion 42 may be cut linearly by chamfering or the like.

(Third Modification of First Embodiment)

Figure 13:
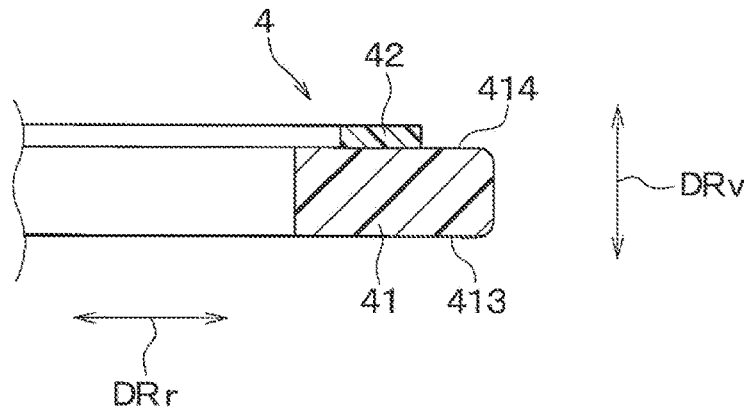
FIG. 13 is a schematic cross-sectional view showing a third modification of a seal ring according to the first embodiment.
Figure 14:
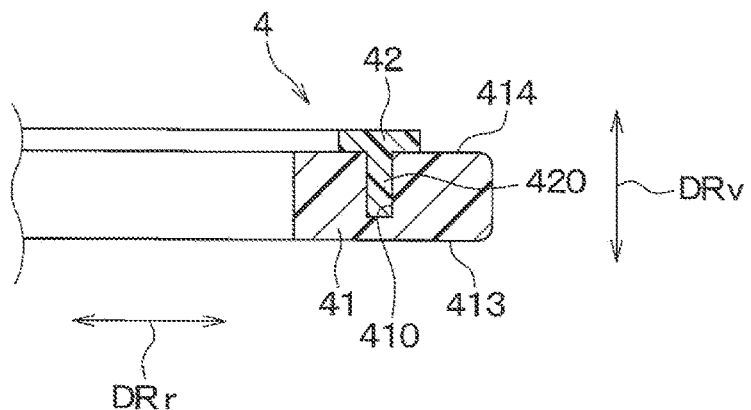
FIG. 14 is a schematic cross-sectional view showing a forth modification of a seal ring according to the first embodiment.

In the seal ring 4 of the first embodiment described above, the ring main body 41 and the protrusion 42 are integrally molded, but the present disclosure is not limited thereto. In the seal ring 4, for example, as shown in FIG. 13, the ring main body 41 and the protrusion 42, which are separately formed from each other, may be integrally joined by an adhesive.

(Fourth Modification of First Embodiment)

Further, for example, in the seal ring 4, the ring main body 41 and the protrusion 42 are separately configured. In this case, a protrusion piece 420 of the protrusion 42 is fitted into a fitting groove 410 provided in the ring main body 41 so as to integrally form the seal ring 4. The seal ring 4 may have an integral structure in which a protrusion provided in the ring main body 41 is fitted into a fitting groove 410 provided in the protrusion 42.

(Other Modifications of First Embodiment)

In the above described first embodiment, various dimensions of the protrusion 42 have been mentioned, but the various dimensions of the protrusion 42 are not limited to those described in the first embodiment. For example, in the protrusion 42, the outer diameter Φpo on the outer side of the radial direction DRr of the seal ring 4 may be larger than the valve diameter Φvo of the valve body 3. That is, the protrusion 42 may be provided so as to extend to the inner diameter portion 41Y and the outer diameter portion 41X of the ring main body 41, respectively.

Further, the thickness Tp of the protrusion 42 in the axial direction DRv may be equal to or larger than the thickness Tr of the ring main body 41. Further, the width Tw of the protrusion 42 in the radial direction DRr may be equal to or greater than the thickness Tp of the axial direction DRv.

Further, the seal ring 4 is provided along the circumferential direction DRc so that the protrusion 42 is continuously connected from the first peripheral end portion 411 to the second peripheral end portion 412 of the ring main body 41, however the present disclosure is not limited thereto. The seal ring 4 may have a portion where the protrusion 42 is not provided other than the gap C between the first peripheral end portion 411 and the second peripheral end portion 412 of the ring main body 41.

Second Embodiment

Next, a second embodiment will be described with reference to FIGS. 15 to 17. In the present embodiment, differences from the first embodiment will be mainly described.

Figure 15:
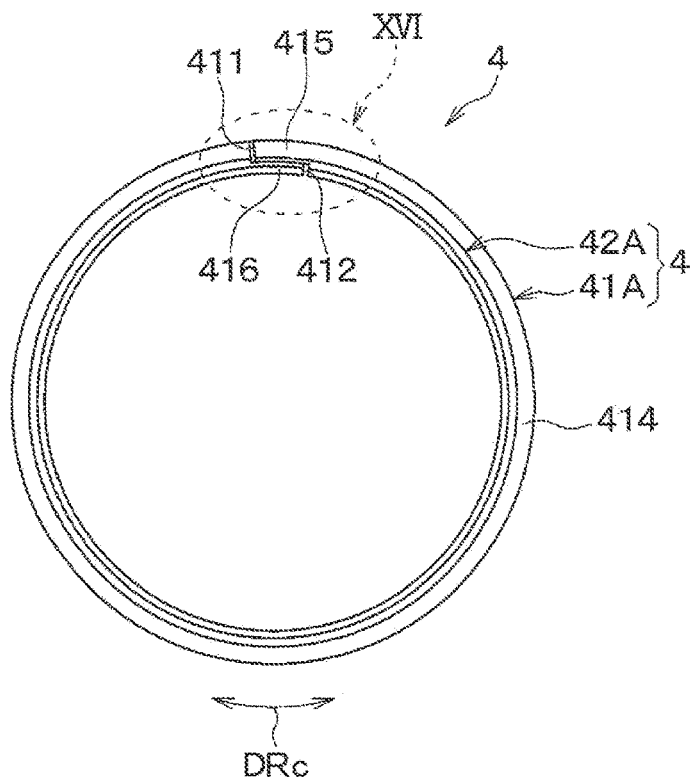
FIG. 15 is a schematic diagram showing a seal ring according to a second embodiment.
Figure 16:
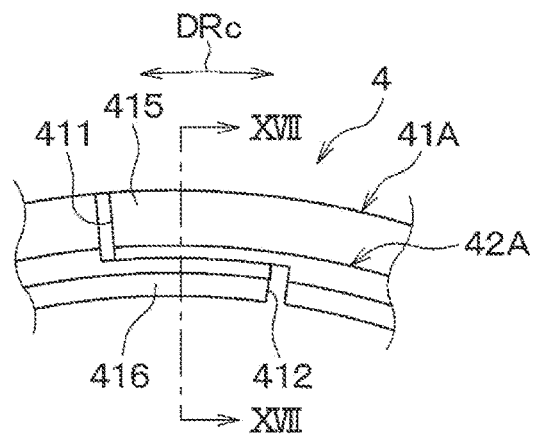
FIG. 16 is a partially enlarged view showing an XVI portion of FIG. 15.
Figure 17:
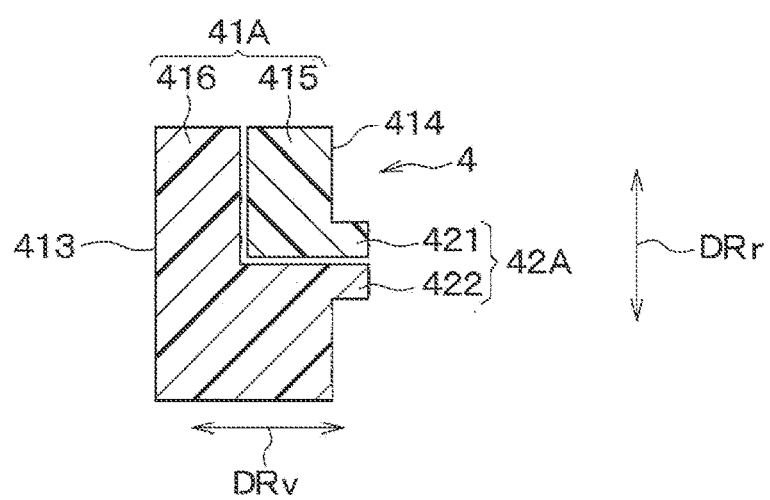
FIG. 17 is a sectional view taken along line XVII-XVII of FIG. 16.

As shown in FIGS. 15 and 16, in a ring main body 41A, the total length of the circumferential DRc is larger than the circumferential length formed by the ring main body 41A, and the end portions of the circumferential DRc overlap each other. That is, in the ring main body 41A, the first peripheral end side portion 415 including a first peripheral end portion 411 and the second peripheral end side portion 416 including a second peripheral end portion 412 overlap each other in the direction intersecting the circumferential DRc.

The first peripheral end side portion 415 and the second peripheral end side portion 416 are configured to form a square ring having a substantially quadrangular cross-sectional shape when overlap each other. Specifically, as shown in FIG. 17, the second peripheral end side portion 416 has an L-shape in a cross section. That is, the second peripheral end side portion 416 has a shape in which the corner portion located outside the radial direction DRr is removed from the portions facing the first groove side surface 322. Further, the first peripheral end side portion 415 has a shape corresponding to the removed corner portion in the second peripheral end side portion 416. That is, the first peripheral end side portion 415 has a quadrangular cross-sectional shape.

As a result, the ring main body 41A is configured such that the first peripheral end side portion 415 and the second peripheral end side portion 416 overlap each other in the axial direction DRv and the radial direction DRr intersecting the circumferential direction DRc.

Further, the protrusion 42A is provided on each of the first peripheral end side portion 415 and the second peripheral end side portion 416. That is, the protrusion 42A is composed of a first convex portion 421 provided in the first peripheral end side portion 415 and a second convex portion 422 provided in the second peripheral end side portion 416. The protrusion 42A is provided over the entire circumferential direction DRc of the ring main body 41A so as to form an annular shape.

The rest of the structure is similar to that of the first embodiment. The seal ring 4 and the valve device 1 of the present embodiment can obtain the effects as in the first embodiment obtained from the same configuration or the uniform configuration as that of the first embodiment.

The seal ring 4 of the present embodiment is configured so that the first peripheral end side portion 415 and the second peripheral end side portion 416 of the ring main body 41A overlap each other in the direction intersecting the circumferential DRc. The protrusion 42A is provided over the entire circumferential direction DRc of the ring main body 41A so as to form an annular shape.

When the protrusion 42A is provided over the entire circumferential direction DRc of the ring main body 41A in this way, a gap between the seal ring 4 and the outer peripheral groove 32 is unlikely to occur. Thus, the deterioration of the sealing property can be sufficiently suppressed.

(Modification of Second Embodiment)

The ring main body 41A of the second embodiment described above is configured such that the first peripheral end side portion 415 and the second peripheral end side portion 416 overlap each other in the axial direction DRv and the radial direction DRr. However, the present disclosure is not limited thereto. The ring main body 41A may be configured such that the first peripheral end side portion 415 and the second peripheral end side portion 416 overlap one of the axial direction DRv and the radial direction DRr.

Further, in the ring main body 41A, the second peripheral end side portion 416 has an L-shape in a cross section and the first peripheral end side portion 415 has a quadrangular shape in a cross section, but the present disclosure is not limited thereto. In the ring main body 41A, for example, the cross-sectional shape of the first peripheral end side portion 415 may be L-shaped and the cross-sectional shape of the second peripheral end side portion 416 may be quadrangular. Alternatively, the cross-sectional shape of each of the first peripheral end side portion 415 and the second peripheral end side portion 416 may be L-shaped.

Further, the seal ring 4 is provided with the protrusion 42 along the entire circumferential direction DRc of the ring main body 41A, but the seal ring 4 is not limited thereto. The seal ring 4 may have a portion where the protrusion 42 is not provided at the position of the ring main body 41A in the circumferential direction DRc.

Third Embodiment

Next, a third embodiment will be described with reference to FIG. 18. In the present embodiment, differences from the first embodiment will be mainly described.

Figure 18:
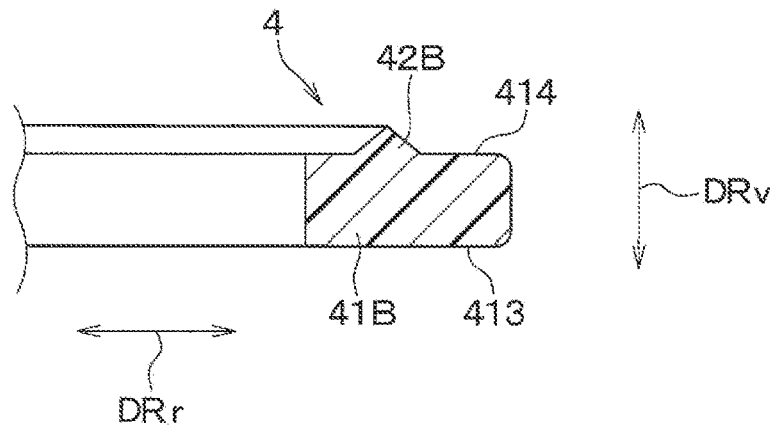
FIG. 18 is a schematic partial cross-sectional view showing a seal ring according to a third embodiment.

As shown in FIG. 18, the protrusion 42B has a tapered shape that tapers toward the tip. That is, the protrusion 42B has a shape in which the cross-sectional shape in the direction orthogonal to the circumferential direction DRc becomes smaller toward the tip.

Specifically, the protrusion 42B has a triangular cross-sectional shape in the direction orthogonal to the circumferential DRc. The width dimension of the protrusion 42B near the boundary with the ring main body 41B is larger than the height dimension in the protrusion direction.

The rest of the structure is similar to that of the first embodiment. The seal ring 4 and the valve device 1 of the present embodiment can obtain the effects as in the first embodiment obtained from the same configuration or the uniform configuration as that of the first embodiment.

The seal ring 4 of the present embodiment has a tapered shape in which the protrusion 42B tapers toward the tip. In this way, if the protrusion 42B has a tapered shape, the contact area between the protrusion 42B and the outer peripheral groove 32 becomes smaller, and pressure is more likely to be concentrated on the local portion. Thus, the surface pressure at the time of contact of the outer peripheral groove 32 of the valve body 3 with the seal ring 4 can be sufficiently increased.

(Modification of Third Embodiment)

In the protrusion 42B of the third embodiment described above, the width dimension near the boundary with the ring main body 41B is larger than the height dimension in the protrusion direction, but the present disclosure is not limited thereto. The width dimension may be equal to or less than the height in the protrusion direction.

Figure 19:
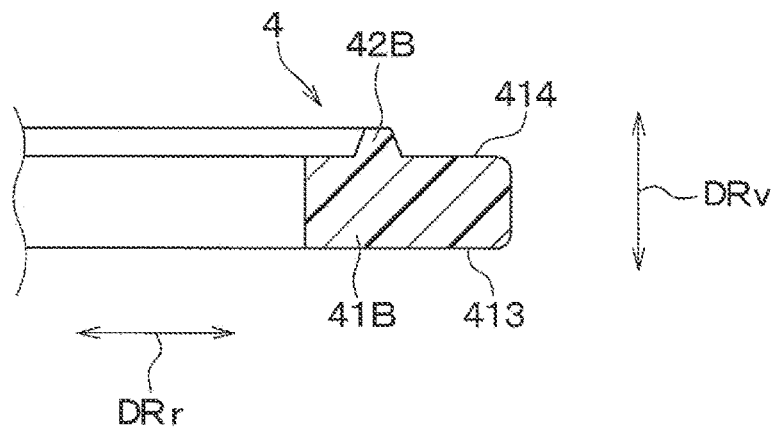
FIG. 19 is a schematic partial cross-sectional view showing a modification of a seal ring according to the third embodiment.

Further, the protrusion 42B has a triangular cross-sectional shape in the direction orthogonal to the circumferential DRc, but is not limited thereto. As shown in FIG. 19, the protrusion 42B may have a trapezoidal shape in which the bottom side on a ring body portion 41B side is longer than the bottom side on a tip side in a cross-section in the direction orthogonal to the circumferential direction DRc.

Fourth Embodiment

Next, a fourth embodiment will be described with reference to FIG. 20. In the present embodiment, differences from the first embodiment will be mainly described.

Figure 20:
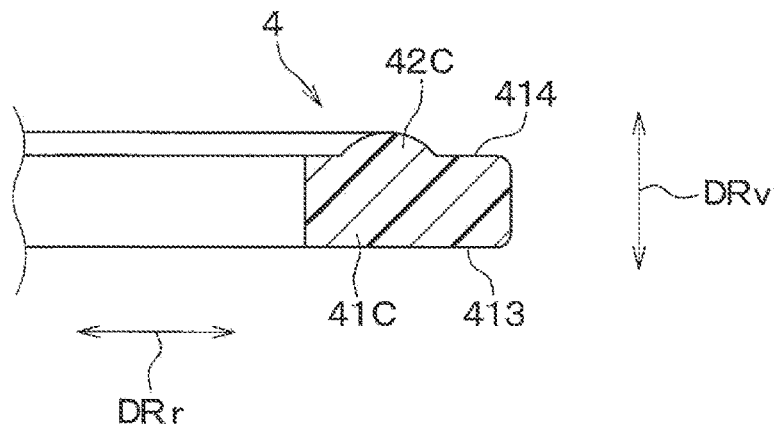
FIG. 20 is a schematic partial cross-sectional view showing a seal ring according to a fourth embodiment.

As shown in FIG. 20, a protrusion 42C has an arc shape in a cross-section in a direction orthogonal to the circumferential direction DRc. The protrusion 42C is raised in an arc shape toward the outer peripheral groove 32. The width dimension of the protrusion 42C near the boundary with the ring main body 41C is larger than the height dimension in the protrusion direction.

The rest of the structure is similar to that of the first embodiment. The seal ring 4 and the valve device 1 of the present embodiment can obtain the effects as in the first embodiment obtained from the same configuration or the uniform configuration as that of the first embodiment.

In the seal ring 4 of the present embodiment, the protrusion 42C has an arc shape in the cross-section. In this way, when the cross-sectional shape of the protrusion 42C is a shape including an arc, since the protrusion 42C has no corners, the outer periphery of the protrusion 42C in contact with the outer peripheral groove 32 is unlikely to change even if the seal ring 4 is twisted or tilted. Therefore, the contact state between the protrusion 42C and the outer peripheral groove 32 can be maintained, and the deterioration of the sealing property due to the deformation of the seal ring 4 can be sufficiently suppressed.

(Modification of Fourth Embodiment)

In the seal ring 4 of the present embodiment, the cross-sectional shape of the protrusion 42C may be not only an arc but also a shape having a flat portion. Further, the protrusion 42C may have a curved surface shape formed by combining arcs having different curvatures.

Fifth Embodiment

Next, a fifth embodiment will be described with reference to FIGS. 21 and 22. In the present embodiment, differences from the first embodiment will be mainly described.

Figure 21:
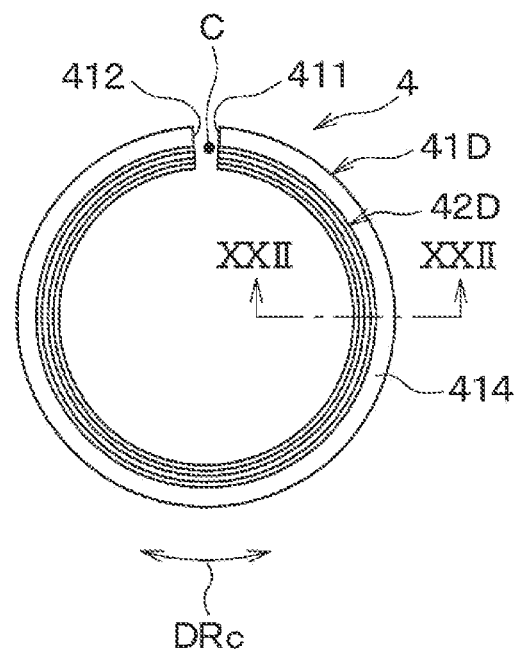
FIG. 21 is a schematic diagram showing a seal ring according to a fifth embodiment.

As shown in FIG. 21, the ring main body 41D is provided with multiple protrusion portions 42D arranged in a direction intersecting the circumferential direction DRc. The multiple protrusion portions 42D are formed at different positions in the radial direction DRr, and each of them extends parallel to the circumferential direction DRc.

Figure 22:
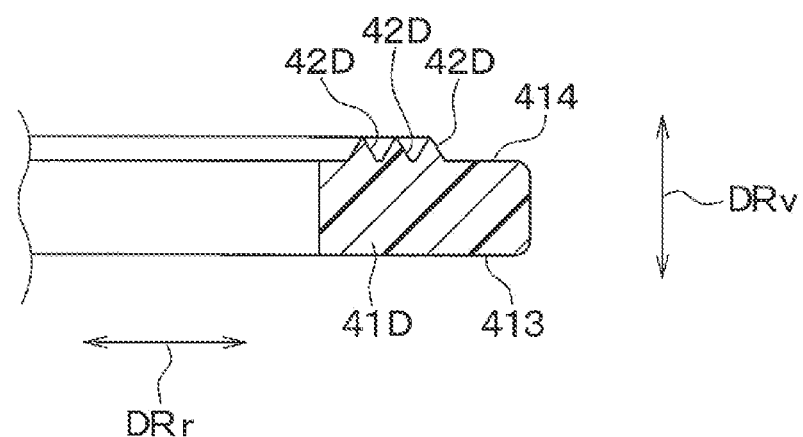
FIG. 22 is a cross-sectional view taken along line XXII-XXII in FIG. 21.

As shown in FIG. 22, each of the multiple protrusion portions 42D has a tapered shape that tapers toward the tip so as not to interfere with each other. Specifically, each of the multiple protrusion portions 42D has a triangular cross-sectional shape in the direction orthogonal to the circumferential direction DRc.

The rest of the structure is similar to that of the first embodiment. The seal ring 4 and the valve device 1 of the present embodiment can obtain the effects as in the first embodiment obtained from the same configuration or the uniform configuration as that of the first embodiment.

In the seal ring 4 of the present embodiment, the multiple protrusion portions 42D are arranged on the ring main body 41D in a direction that intersects the circumferential direction DRc. According to this, the contact area between the seal ring 4 and the outer peripheral groove 32 can be expanded, and the deterioration of the sealing property due to the deformation of the ring main body 41D can be sufficiently suppressed.

(Modification of Fifth Embodiment)

The ring main body 41D of the fifth embodiment described above has the same shape as the ring main body 41 described in the first embodiment, but is not limited thereto. Alternatively, the ring main body 41D may have the same shape as the ring main body 41A described in the second embodiment.

Further, each of the multiple protrusion portions 42D has a triangular cross-sectional shape in the direction orthogonal to the circumferential direction DRc, but the cross-sectional shape is not limited thereto. Each of the multiple protrusion portions 42D has a quadrangular shape or a shape that includes an arc. Further, in the multiple protrusion portions 42D, at least one of the multiple protrusion portions 42D may have a different cross-sectional shape from the other protrusion portions 42D.

Other Embodiments

Although representative embodiments of the present disclosure have been described above, the present disclosure is not limited to the embodiments described above, and various modifications can be made, for example, as follows.

In the above described embodiments, the protrusion 42 is provided at the inner diameter portion 41Y of the ring main body 41, but the seal ring 4 is not limited thereto. In the seal ring 4, for example, a part of the protrusion 42 may be provided at the outer diameter portion 41X of the ring main body 41.

In the above described embodiments, the protrusion 42 is provided on the second groove facing surface 414 of the ring main body 41, but the seal ring 4 is not limited thereto. In the seal ring 4, the protrusion 42 may be provided on the first groove facing surface 413 of the ring main body 41.

In the above described embodiments, the seal ring 4 having the first peripheral end portion 411 and the second peripheral end portion 412 is exemplified, but the seal ring 4 is not limited thereto. The seal ring 4 may have an O-shape as long as the shape can be expanded in the radial direction DRr.

In the above described embodiments, the ring main body 41 is provided with the protrusion 42 on each of the first groove facing surface 413 and the second groove facing surface 414, but the seal ring 4 is not limited thereto. The seal ring 4 may be provided with a protrusion 42 on a surface other than the first groove facing surface 413 and the second groove facing surface 414 of the ring main body 41, for example.

In the above described embodiments, the valve device 1 including the seal ring 4 of the present disclosure is applied to an EGR valve, but the application target is not limited to an EGR valve. The valve device 1 including the seal ring 4 of the present disclosure is applicable to various valves other than the EGR valve.

In the embodiments described above, it is needless to say that the elements configuring the embodiments are not necessarily essential except in the case where those elements are clearly indicated to be essential in particular, the case where those elements are considered to be obviously essential in principle, and the like.

In the embodiments described above, the present disclosure is not limited to the specific number of components of the embodiments, except when numerical values such as the number, numerical values, quantities, ranges, and the like are referred to, particularly when it is expressly indispensable, and when it is obviously limited to the specific number in principle, and the like.

In the embodiments described above, when referring to the shape, positional relationship, and the like of a component and the like, it is not limited to the shape, positional relationship, and the like, except for the case where it is specifically specified, the case where it is fundamentally limited to a specific shape, positional relationship, and the like, and the like.

Conclusion

According to a first aspect shown in part or all of the above described embodiments, the seal ring the ring main body fitted in the outer peripheral groove formed on the outer peripheral edge, and a protrusion that extends in the circumferential direction of the ring main body and protrudes from the ring main body toward the outer peripheral groove. The outer peripheral groove has the groove bottom surface facing the inner peripheral surface when the valve body is fully closed, and the pair of groove side surfaces that are connected to the groove bottom surface and face each other. The ring main body has the pair of groove facing surfaces that at least partially face the pair of groove side surfaces. The protrusion is provided on at least one of the pair of groove facing surfaces.

According to a second aspect, the ring main body has the outer diameter portion located outside the outer peripheral groove and the inner diameter portion located inside the outer peripheral groove when fitted into the outer peripheral groove. The protrusion is provided at the inner diameter portion.

When the protrusion is provided at the inner diameter portion of the ring main body, the seal ring is easy to be in contact with the outer peripheral groove compared with a case where a protrusion is provided at the outer diameter portion. Thus, the configuration can suppress a decrease in the contact surface pressure. In addition, since the seal ring is easily in contact with the outer peripheral groove, it is possible to prevent the seal ring from coming out of the outer peripheral groove.

According to a third aspect, the pair of groove facing surfaces are the first groove facing surface and the second groove facing surface opposite to the first groove facing surface. The second groove facing surface is located more downstream of the fluid passage than the first groove facing surface when the valve body is fully closed. The protrusion is provided at least on the second groove facing surface.

According to this, the protrusion is pressed against the second groove facing surface of the outer peripheral groove by the fluid flowing through the fluid passage when the valve body is fully closed. At this time, since the pressure at the time of contact is concentrated on the protrusion, it is possible to sufficiently secure the surface pressure at the time of contact between the outer peripheral groove of the valve body and the seal ring.

According to a fourth aspect, the ring main body has a C-shape. The protrusion is the protrusion is continuously provided from one of the pair of peripheral ends to another one of the pair of peripheral ends in the circumferential direction.

When the protrusion is provided from one peripheral end of the ring main body to the other peripheral end in this way, a gap between the seal ring and the outer peripheral groove is unlikely to occur, so that the deterioration of the sealing property can be sufficiently suppressed.

According to a fifth aspect, the ring main body has portions each includes one of the pair of peripheral ends located at ends of the ring main body in the circumferential direction. The portions overlap each other in a direction that intersect with the circumferential direction. The protrusion is provided over the entire circumferential direction of the ring body so as to form an annular shape.

When the protrusion is provided over the entire circumferential direction of the ring main body in this way, a gap between the seal ring and the outer peripheral groove is unlikely to occur. Thus, the deterioration of the sealing property can be sufficiently suppressed.

According to a sixth aspect, the protrusion has a quadrangular cross-sectional shape in the direction orthogonal to the circumferential. As described above, when the cross-sectional shape of the protrusion is quadrangular, the protrusion makes it easier for the seal ring to come into contact with the outer peripheral groove, so that it is possible to suppress a decrease in the surface pressure at the time of contact.

According to a seventh aspect, the protrusion has a tapered shape that tapers toward the tip. In this way, when the protrusion has a tapered shape, the contact area between the protrusion and the outer peripheral groove becomes smaller. Thus, the surface pressure at the time of contact with the seal ring can be sufficiently increased.

According to an eighth aspect, the protrusion has a cross-sectional shape including an arc in a direction orthogonal to the circumferential direction. In this way, when the cross-sectional shape of the protrusion is a shape including an arc, the outer periphery of the protrusion in contact with the outer peripheral groove is unlikely to change even if the seal ring is twisted or tilted. Thus, the contact state between the protrusion and the outer peripheral groove can be maintained. As a result, it is possible to sufficiently suppress the deterioration of the sealing property due to the deformation of the seal ring.

According to a ninth aspect, the protrusion is provided by a plurality of protrusion portions, and the plurality of protrusion portions are arranged in a direction intersecting the circumferential direction. According to this, the contact area between the seal ring and the outer peripheral groove can be expanded, and the deterioration of the sealing property due to the deformation of the ring main body can be sufficiently suppressed.

According to a tenth aspect, the valve device includes a valve body that changes an opening degree of a fluid passage through which a fluid passes, and a seal ring made of resin that seals, when the valve body fully closes the fluid passage, between an inner peripheral surface defining the fluid passage and an outer peripheral edge of the valve body. The seal ring has a ring main body fitted in an outer peripheral groove formed on the outer peripheral edge, and a protrusion provided on the ring main body, that extends in a circumferential direction of the ring main body, and that protrudes from the ring main body toward the outer peripheral groove. The outer peripheral groove has the groove bottom surface facing the inner peripheral surface when the valve body is fully closed, and the pair of groove side surfaces that are connected to the groove bottom surface and face each other. The ring main body has the pair of groove facing surfaces that at least partially face the pair of groove side surfaces. The protrusion is provided on at least one of the pair of groove facing surfaces.

What is claimed is:

1. A seal ring made of resin, applied to a valve body that changes an opening degree of a fluid passage through which a fluid passes, and that seals, when the valve body fully closes the fluid passage, between an inner peripheral surface defining the fluid passage and an outer peripheral edge of the valve body, the seal ring comprising:
   a ring main body fitted in an outer peripheral groove formed on the outer peripheral edge; and
   a protrusion provided on the ring main body, that extends in a circumferential direction of the ring main body, and that protrudes from the ring main body toward the outer peripheral groove, wherein
   the valve body is provided as a butterfly valve,
   the outer peripheral groove has a groove bottom surface facing the inner peripheral surface when the valve body is fully closed, and a pair of groove side surfaces that are connected to the groove bottom surface and face each other,
   the ring main body has a pair of groove facing surfaces that at least partially face the pair of groove side surfaces,
   the protrusion is provided on at least one of the pair of groove facing surfaces,
   the ring main body has a C-shape,
   the ring main body has a pair of peripheral ends,
   the protrusion is continuously provided from one of the pair of peripheral ends to another one of the pair of peripheral ends in the circumferential direction, and
   the one of the pair of peripheral ends and the other one of the pair of peripheral ends define a predetermined gap therebetween.

2. The seal ring according to claim 1, wherein
   the ring main body has an outer diameter portion located outside the outer peripheral groove and an inner diameter portion located inside the outer peripheral groove when fitted into the outer peripheral groove, and
   the protrusion is provided at the inner diameter portion.

3. The seal ring according to claim 1, wherein
   the pair of groove facing surfaces are a first groove facing surface and a second groove facing surface opposite to the first groove facing surface,
   the second groove facing surface is located more downstream of the fluid passage than the first groove facing surface when the valve body is fully closed, and
   the protrusion is provided at least on the second groove facing surface.

4. The seal ring according to claim 1, wherein
the ring main body has portions each including one of the pair of the peripheral ends located at ends of the ring main body in the circumferential direction,
the portions overlap each other in a direction that intersect with the circumferential direction, and
the protrusion is provided over an entire area of the ring main body in the circumferential direction so as to form an annular shape.

5. The seal ring according to claim 1, wherein
the protrusion has a quadrangular cross-sectional shape in a direction orthogonal to the circumferential direction.

6. The seal ring according to claim 1, wherein
the protrusion has a tapered shape that tapers toward a tip.

7. The seal ring according to claim 1, wherein
the protrusion has a cross-sectional shape including an arc in a direction orthogonal to the circumferential direction.

8. The seal ring according to claim 1, wherein
the protrusion is provided by a plurality of protrusion portions, and
the plurality of protrusion portions are arranged in a direction intersecting the circumferential direction.

9. A valve device comprising:
a valve body provided as a butterfly valve and that changes an opening degree of a fluid passage through which a fluid passes, and
a seal ring made of resin and that seals, when the valve body fully closes the fluid passage, between an inner peripheral surface defining the fluid passage and an outer peripheral edge of the valve body, wherein
the seal ring includes
a ring main body fitted in an outer peripheral groove formed on the outer peripheral edge; and
a protrusion provided on the ring main body, that extends in a circumferential direction of the ring main body, and that protrudes from the ring main body toward the outer peripheral groove, wherein the outer peripheral groove has a groove bottom surface facing the inner peripheral surface when the valve body is fully closed, and a pair of groove side surfaces that are connected to the groove bottom surface and face each other,
the ring main body has a pair of groove facing surfaces that at least partially face the pair of groove side surfaces,
the protrusion is provided on at least one of the pair of groove facing surfaces,
the ring main body has a C-shape,
the ring main body has a pair of peripheral ends,
the protrusion is continuously provided from one of the pair of peripheral ends to another one of the pair of peripheral ends in the circumferential direction, and
the one of the pair of peripheral ends and the other one of the pair of peripheral ends define a predetermined gap therebetween.

10. The seal ring according to claim 1, wherein
the ring main body and the protrusion are an integrally molded member that is integrally molded.

11. The seal ring according to claim 10, wherein
the pair of groove side surfaces are flat surfaces extending in a radial direction of the valve body.

12. The seal ring according to claim 10, wherein
an outer diameter of the protrusion on an outer side of a radial direction of the valve body is larger than a diameter of the valve body.

13. The valve device according to claim 9, wherein
the ring main body and the protrusion are an integrally molded member that is integrally molded.

14. The valve device according to claim 13, wherein
the pair of groove side surfaces are flat surfaces extending in a radial direction of the valve body.

15. The valve device according to claim 13, wherein
an outer diameter of the protrusion on an outer side of a radial direction of the valve body is larger than a diameter of the valve body.

* * * * *